(12) United States Patent
Tarajano

(10) Patent No.: US 11,571,058 B2
(45) Date of Patent: Feb. 7, 2023

(54) COSMETIC APPLICATOR WITH A FIRM BASE AND AN ATTACHED CUSHIONING MEMBER

(71) Applicant: L'Oreal, Paris (FR)

(72) Inventor: Lemis Tarajano, New York, NY (US)

(73) Assignee: L'OREAL, Paris (FR)

( * ) Notice: Subject to any disclaimer, the term of this patent is extended or adjusted under 35 U.S.C. 154(b) by 427 days.

(21) Appl. No.: 15/994,969

(22) Filed: May 31, 2018

(65) Prior Publication Data
US 2019/0365081 A1 Dec. 5, 2019

(51) Int. Cl.
*A45D 40/26* (2006.01)
*A45D 34/04* (2006.01)
*B29C 45/14* (2006.01)
*B29K 101/12* (2006.01)
*B29L 31/00* (2006.01)

(52) U.S. Cl.
CPC ......... *A45D 40/262* (2013.01); *A45D 34/042* (2013.01); *B29C 45/14811* (2013.01); *A46B 2200/1046* (2013.01); *B29K 2101/12* (2013.01); *B29L 2031/718* (2013.01)

(58) Field of Classification Search
CPC .. A45D 40/262; A45D 40/264; A45D 40/265; A45D 40/267; A45D 40/268; A45D 40/26; A45D 40/28; A45D 34/042; A45D 34/04; A45D 34/06; A45D 34/045; A45D 34/043; A45D 2200/1018; A45D 2200/1009; A45D 2200/1036; A45D 2200/1045; A46D 1/00; A46D 1/0253; A46D 1/0276; A46D 1/0238; A46D 1/0269; A46B 2200/1053; A46B 2200/1046; A46B 2200/106; A46B 2200/10; A46B 9/00; A46B 9/02; A46B 9/021; A46B 9/026; A46B 9/028; A47L 13/16; A47L 13/12
USPC ............................... 604/14; 15/244.1, 244.4
See application file for complete search history.

(56) References Cited

U.S. PATENT DOCUMENTS

| | | | | |
|---|---|---|---|---|
| 1,822,725 A | * | 9/1931 | Cooper | A47L 13/257 15/105 |
| 5,261,426 A | * | 11/1993 | Kellett | A45D 2/22 132/108 |
| 5,772,347 A | * | 6/1998 | Gueret | A45D 40/04 401/175 |
| 5,904,151 A | * | 5/1999 | Gueret | A45D 40/00 132/293 |
| 6,053,179 A | * | 4/2000 | Lhuisset | A45D 40/262 132/142 |
| 6,220,254 B1 | * | 4/2001 | Gueret | A45D 40/267 132/218 |
| 6,371,132 B1 | | 4/2002 | Lacout | |

(Continued)

FOREIGN PATENT DOCUMENTS

WO 2015193937 A1 12/2015
WO 2016046355 A1 3/2016

*Primary Examiner* — Rachel R Steitz
*Assistant Examiner* — Karim Asqiriba
(74) *Attorney, Agent, or Firm* — Christensen O'Connor Johnson Kindness PLLC

(57) ABSTRACT

A cosmetic applicator includes a non-porous base and a first porous cushioning member molded onto the base that is configured to retain a predetermined amount of cosmetic formulation. A method of forming a cosmetic applicator includes forming a non-porous base and forming a first porous cushioning member on the base.

11 Claims, 3 Drawing Sheets

(56) References Cited

U.S. PATENT DOCUMENTS

| | | | | |
|---|---|---|---|---|
| D461,277 S * | 8/2002 | Angeletta | | D28/7 |
| 6,601,264 B1 * | 8/2003 | Hendricks | | B60S 3/045 |
| | | | | 15/210.1 |
| 6,675,812 B1 * | 1/2004 | Wiley | | A45D 19/02 |
| | | | | 132/108 |
| 6,681,777 B2 | 1/2004 | Gueret | | |
| 6,746,165 B2 * | 6/2004 | de Laforcade | | A45D 19/02 |
| | | | | 401/10 |
| 7,866,327 B1 | 1/2011 | Gueret | | |
| 8,191,559 B2 * | 6/2012 | Bickford | | A45D 40/265 |
| | | | | 132/218 |
| 8,205,624 B2 * | 6/2012 | Gueret | | A45D 40/265 |
| | | | | 132/218 |
| 8,250,698 B2 * | 8/2012 | Gavney, Jr. | | A47L 11/30 |
| | | | | 15/121 |
| 8,286,649 B2 * | 10/2012 | Gueret | | A45D 34/045 |
| | | | | 132/320 |
| 10,888,145 B2 * | 1/2021 | Kukreja | | A45D 34/045 |
| 2002/0005209 A1 * | 1/2002 | Gueret | | A46B 9/021 |
| | | | | 132/218 |
| 2004/0018037 A1 * | 1/2004 | Gueret | | A46D 1/0238 |
| | | | | 401/126 |
| 2006/0272114 A1 * | 12/2006 | Kaufman | | A46B 7/04 |
| | | | | 15/210.1 |
| 2006/0272670 A1 * | 12/2006 | Gueret | | A45D 34/042 |
| | | | | 132/317 |
| 2006/0279181 A1 * | 12/2006 | Gueret | | A45D 40/262 |
| | | | | 312/218 |
| 2007/0020027 A1 * | 1/2007 | Gueret | | A45D 40/262 |
| | | | | 401/130 |
| 2007/0048066 A1 * | 3/2007 | Dumler | | A45D 40/265 |
| | | | | 401/130 |
| 2011/0094534 A1 * | 4/2011 | Bickford | | A45D 40/265 |
| | | | | 132/218 |
| 2012/0284942 A1 * | 11/2012 | Gavney, Jr. | | A47L 11/4036 |
| | | | | 15/118 |
| 2015/0296957 A1 * | 10/2015 | Megaro | | B05B 11/3001 |
| | | | | 401/145 |
| 2016/0073763 A1 * | 3/2016 | Matsui | | A45D 40/26 |
| | | | | 401/118 |
| 2017/0020266 A1 * | 1/2017 | Sanchez | | A45D 40/265 |

* cited by examiner

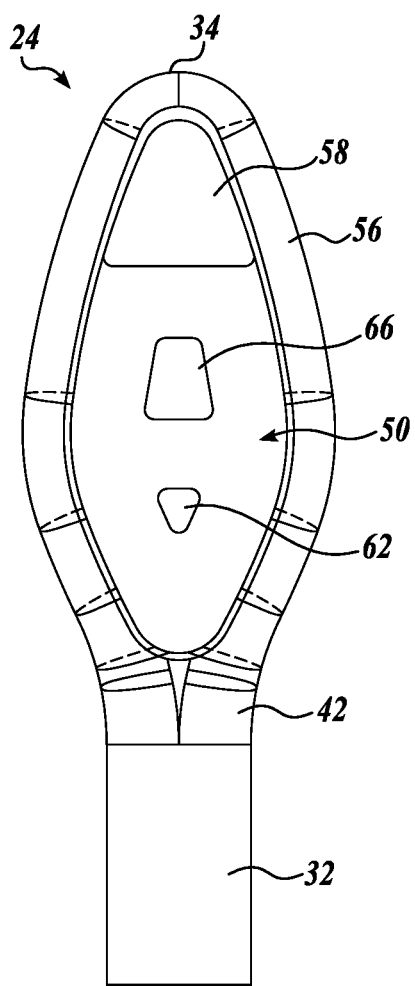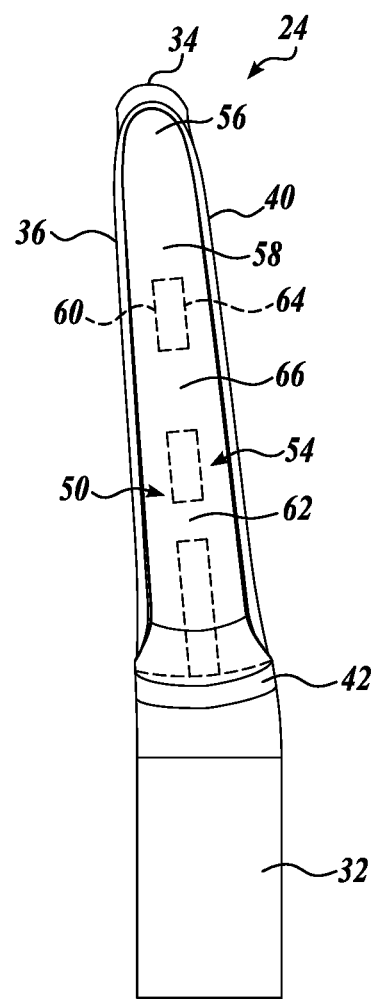
FIG. 4A  FIG. 4B

COSMETIC APPLICATOR WITH A FIRM BASE AND AN ATTACHED CUSHIONING MEMBER

SUMMARY

A cosmetic applicator includes a non-porous base and a first porous cushioning member molded onto the base that is configured to retain a predetermined amount of cosmetic formulation.

A method of forming a cosmetic applicator includes forming a non-porous base and forming a first porous cushioning member on the base.

In one aspect, the method includes forming the non-porous base and the first porous cushioning member from a material chosen from the group consisting of polyethylene, polypropylene, propylene, styrene-ethylene polymer, butylene-styrene polymer, thermo polymer, and any combination thereof.

In another aspect, the method includes forming the non-porous base in a first mold and forming the first porous cushioning member in a second mold.

In another aspect, the method includes submerging the first porous cushioning member in a bath after being molded to define pores within the first porous cushioning member.

In another aspect, the method includes molding the non-porous base with a first material, and molding the first porous cushioning member with the first material having a soluble filler that dissolves in the bath.

In another aspect, the method includes bi-injecting the non-porous base and the first porous cushioning member.

In another aspect, the method includes covering only a portion of the non-porous base with the first porous cushioning member such that the non-porous base is exposed for use during application of a cosmetic formulation.

In another aspect, the method includes forming the first porous cushioning member over the non-porous base such that a plurality of bristles extending from the non-porous base extend through the first porous cushioning member.

In another aspect, the method includes forming the first porous cushioning member over substantially the entire non-porous base.

In another aspect, the method includes flocking at least a portion of the non-porous base.

In another aspect, the method includes forming the first porous cushioning member to define a reservoir for retaining a predetermined amount of cosmetic formulation.

In another aspect, the method includes forming at least one recess in the non-porous base and thereafter forming the first porous cushioning member within the at least one recess.

In another aspect, the method includes forming first and second recesses in the non-porous base and at least one opening extending between the first and second recesses.

In another aspect, the method includes forming the first porous cushioning member in the first recess and a second porous cushioning member in the second recess.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 4A is a front view of the cosmetic applicator of FIG. 1, showing the cushioning member removed;

FIG. 4B is a side view of the cosmetic applicator of FIG. 1, showing the cushioning member removed;

DETAILED DESCRIPTION

Figure 3:
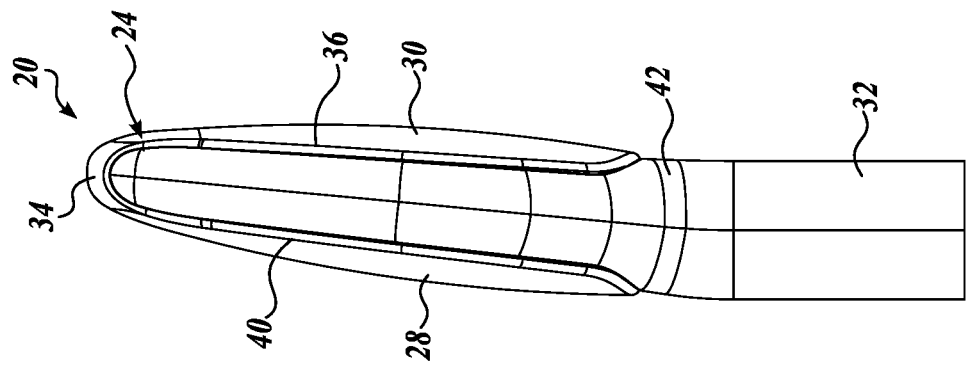
FIG. 3 is a side view of the cosmetic applicator of FIG. 1.

Cosmetic formulations are often applied to a person's face, hair, skin, nails, etc. ("keratinous materials"), with an applicator. The applicator configuration will depend on the intended end use, but it may include an applicator element defined by a brush, sponge, bristle, molded portion, etc. For instance, cosmetic formulas applied to (or removed from) the lips or eyes may be applied or removed with an applicator tip defined on the end of stem or wand.

An applicator tip may be defined by flocked plastic, silicone, TPE, etc., which have a density and firmness that do not provide adequate sensorial and cushion effects during use. For instance, a denser, firmer applicator tip may be too firm to provide a fingertip-like sensation to the user during application or removal of a cosmetic formulation. In addition, an applicator tip made of a denser, firmer material, such as plastic, silicone, TPE, etc., does not act as a reservoir to sufficiently retain cosmetic formulation for application. Using a softer, more absorbent material like foam, on the other hand, does not provide sufficient structure for precise application of the cosmetic formulation.

To help overcome some of these issues, some prior art applicator tips include a firm core made from plastic or the like to help improve precision, and the core is covered in a softer flocking or foam to improve retention of the cosmetic formulation and comfort during use. Other prior art designs employ grooves or recesses in the core that act as reservoirs for the cosmetic formulation. However, none of these prior art designs provide sufficient cushioning effect, precise application, adequate cosmetic formulation retention, and durability. Thus, an improved cosmetic applicator is desired.

Referring to FIGS. 1-4, a first exemplary embodiment of a cosmetic applicator 20 will now be described in detail. The cosmetic applicator 20 generally includes a base 24 made from a first material and attached cushioning members 28 and 30 made from a second material that is more porous and/or less rigid, firm, dense, etc., than the first material. In general, the base 24 provides structure, stability, and precision to the applicator 20, while the attached cushioning members 28 and 30 provide the beneficial cushioning and reservoir effects. The base 24 and cushioning members 28 and 30 are bonded together during the manufacturing process to define a secure attachment therebetween.

The cosmetic applicator 20 is shown and described as an applicator tip secured to or otherwise formed on the end of a stem 32 (only partially shown). In that regard, the cosmetic applicator 20 may be suitable for application/removal of cosmetic formulations to eyes, lips, targeted areas of the face, etc. ("keratinous materials"). It should be appreciated, however, that the cosmetic applicator 20 may instead be any other configuration suitable for other applications. Accordingly, the descriptions and illustrations provided herein should not be seen as limiting the scope of the claimed subject matter.

The base 24 will now be described in detail. In general, the base 24 is a firm, non-porous portion of the cosmetic applicator 20. The base 24 is of a suitable material, shape, size, etc., for precisely applying and/or removing a cosmetic formulation to/from a desired area of a user while providing sufficient structure for the cushioning members 28 and 30.

Figure 2:
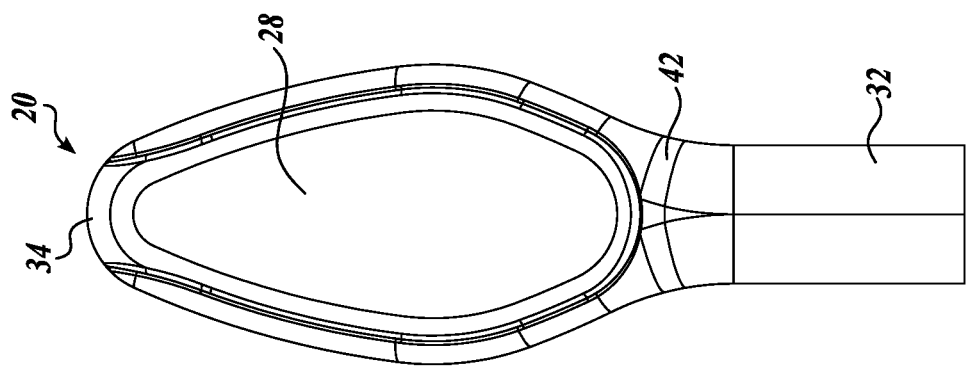
FIG. 2 is a front view of the cosmetic applicator of FIG. 1.
Figure 1:
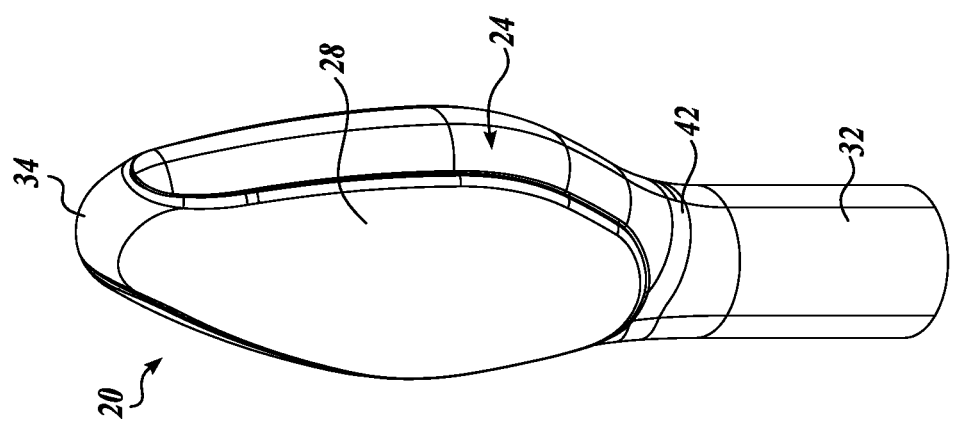
FIG. 1 is an isometric view of a cosmetic applicator formed in accordance with an exemplary embodiment of the present disclosure, wherein the cosmetic applicator includes a firm base and a cushioning member.

In one embodiment, the base 24 is a substantially flattened ellipsoid shape with a narrowed or somewhat tapered distal end 34 (see FIGS. 2 and 4A). The base 24 has a thickness extending between first and second opposing flattened sides 36 and 40, wherein the thickness tapers slightly as the base 24 extends from a proximal end 42 to the distal end 34 (see FIGS. 3 and 4B). In that regard, the base 24 is generally elongated and rectangular in cross-sectional shape with a rounded distal end 34 (see FIGS. 3 and 4B). The stem 32 may have a substantially similar shape as the base 24, or the stem 32 may instead be generally cylindrical in shape, with the cylindrical shape of the stem 32 transitioning to a generally flattened ellipsoid shape at the proximal end 42 of the base 24. With the base 24 having the above-described shape, the cosmetic applicator 20 is suitable for application/removal of cosmetic formulations to smaller areas of keratinous materials, such as the eyes, lips, targeted areas of the face, etc. However, as noted above, the shape and size may be configured for other suitable uses.

As can best be seen in FIGS. 4A and 4B, in the depicted embodiment, the base 24 includes first and second recessed areas 50 and 54 extending into the first and second opposing flattened sides 36 and 40 of the base 24 that are configured to receive and define the shape of the cushioning members 28 and 30. The first and second recessed areas 50 and 54 extend from an outer surface of the base 24 toward a first and second bottom surface 60 and 64, respectively, within the base 24. A base perimeter wall 56 extends around the perimeter of the recessed areas 50 and 54.

The overall shape of the recessed areas 50 and 54 are generally the same overall shape as the base 24 (i.e., generally elliptical with a slightly tapered distal end). The recessed areas 50 and 54 have a suitable depth for receiving and defining the cushioning members 28 and 30. As can be seen in FIG. 4B, the recessed areas 50 and 54 generally have a depth that is about ⅔ of the thickness of the base 24.

In one aspect, the depth and/or size of the recessed areas 50 and 54 can be increased or decreased to provide more or less firmness or stability to the cushioning members 28 and 30. In another aspect, the depth and/or size of the recessed areas 50 and 54 can be increased or decreased to provide less or more of a cushioning effect for the cushioning members 28 and 30. In yet another aspect, the depth and/or size of the recessed areas 50 and 54 can be increased or decreased to adjust the size of the "reservoir" defined by the recessed areas 50 and 54. The recessed areas 50 and 54 may be sized for optimal dosing of a cosmetic formulation during application. It should be appreciated that the recessed areas 50 and 54 may be any other suitable shape and configuration. For instance, in one embodiment, the base 24 includes only the first recessed area 50 for defining the first cushioning member 28, and the opposite (back) side of the base 24 is a flocked plastic or other firm material for more precise or firmer application.

In one embodiment, a plurality of openings extend substantially transversely through the base 24 from the first recessed area 50 to the second recessed area 54 to place the recessed areas into fluid communication during an injection molding process. In the depicted embodiment, the base 24 includes a first distal opening 58 defined at the distal end of the recessed areas 50 and 54, a second proximal opening 62 defined near the proximal end of the recessed areas 50 and 54, and a third middle opening 66 defined between that first and second openings 58 and 62. Any other suitable configuration of openings may instead be used.

As noted above, the openings 58, 62 and 66 place the recessed areas 50 and 54 into fluid communication during an injection molding process. In that regard, the cushioning members 28 and 30 may be secured onto the base 24 and to each other through a suitable bi-injection molding process or similar. More specifically, bi-injection molding may be used to create a strong bond between the harder base 24 and the softer cushioning members 28 and 30, thereby securing the cushioning members 28 and 30 to the base 24. The cushioning members 28 and 30 may be bi-injected onto the base 24 in a manner well known in the art. As can be appreciated, the softer material of the cushioning members 28 and 30 may extend through the openings 58, 62, and 66 of the base 24 such that the cushioning members 28 and 30 are intertwined with the base 24 and connected to each other.

In another embodiment, the cushioning members 28 and 30 may be attached to the base 24 using an overmolding process. In one example, the overmolding process is completed by providing the base 24 in the mold, and then over-molding the cushioning members 28 and 30 onto the base 24 to form a unitary structure. This process creates a secure bond between the cushioning members 28 and 30 and the base 24 without requiring the need for a separate adhesive. The solid part or base 24 may be made using a different process, such as by way of injection molding.

In some embodiments, additional or alternative structure or methods may be used to define the bond/attachment between the cushioning members 28 and 30 and the base 24. For instance, the base 24 and the cushioning members 28 and 30 may be chemically attached by coating the recessed areas 50 and 54 with adhesives before adding the overmolded cushioning member material. As yet another alternative, the recessed areas 50 and 54 of the base 24 may be scored or altered slightly with projections or recessions to better attach to the overmolded material. More specifically, the projections or recessions increase the overall surface area and therefore the bond between the two materials.

Further details of a molding process suitable for overmolding the cushioning members 28 and 30 onto the base 24 are illustrated and described in U.S. Patent Publication No. 2016/0073763, published on Mar. 17, 2016, entitled "Cosmetic Devices, Precursor Therefor and Related Methods," the entire disclosure of which is incorporated by reference herein. Any of the processes, materials, fillers, etc., described or illustrated in U.S. Patent Publication No. 2016/0073763, may be used.

As noted above, the base 24 is made from a first material, and the cushioning members 28 and 30 are made from a second material that is less rigid, firm, dense, etc., than the first material. In one embodiment, the base 24 is made from a non-porous or solid material, and the cushioning members 28 and 30 are made from a porous material that is capable of retaining a liquid or a flowable solid, such as a typical cosmetic formulation, and that is capable of providing cushioning sensorial effects. In one embodiment, the base 24 has a stiffness of about 70 Shore A to allow for precise application of cosmetic formulation, and the cushioning members 28 and 30 have a stiffness below about 15 Shore A to provide a satisfactory sensorial experience.

The cushioning members 28 and 30 may be defined as an open cell or semi-open cell foam or sponge formed from a suitable material, such as a synthetic polymer, a natural polymer, or a combination thereof. The material used may possess some degree of elasticity in order for the pores of the cushioning members 28 and 30 to be compressed to absorb and dispense the cosmetic formulation. For example, the cushioning member material may be an elastomer, such as polyethylene, polypropylene, propylene, polyurethane, styrene-ethylene/butylene-styrene polymers or a thermo polymer (such as a thermoplastic polyester elastomers and thermoplastic vulcanizates), or another suitable material.

The porous cushioning members 28 and 30 may not initially be porous (including during the formation process, such as bi-injection molding or overmolding), but instead may be of the same material as the solid base 24 with the addition of a soluble filler. Specifically, the cushioning members 28 and 30 may comprise a water soluble filler that is absent from the solid base 24. Accordingly, upon contact with water or a water-based solution, the filler dissolves and pores remain, thereby rendering the cushioning members 28 and 30 capable of functioning as a foam or sponge for absorbing or applying the cosmetic without affecting the solid base 24.

As can be appreciated, it is possible to vary the pore sizes within the cushioning members 28 and 30. Both the type of filler or fillers used, as well as the concentrations thereof, will determine the pore size and number. The porosity of the cushioning members 28 and 30 may be varied to act as reservoirs for cosmetic formulations of different viscosities. As a specific non-limiting example, foam having a porosity of about 25 microns will be suitable for a water thin cosmetic formulation.

The reservoir effect of the cushioning members 28 and 30 can be especially important in certain applications where the applied volume of the cosmetic formulation is built through repeated application. For instance, users typically apply several layers of mascara formulation to increase the thickness and/or length of the lashes. The cushioning members 28 and 30 can hold a sufficient amount of mascara formulation for repeated, layered use of the cosmetic applicator 20 to build lash thickness and/or length.

The base 24, or non-porous part, is a solid material. In one embodiment, at least the base perimeter wall 56 of the base 24 is a flocked plastic such that it may be used for any precise application of cosmetic formulation. The base 24 may optionally be formed of the same base material as the porous part or cushioning members 28 and 30, such as a synthetic polymer, a natural polymer, or a combination thereof. In one embodiment, the base portion 124 and the cushioning members 28 and 30 are injection molded with polyethylene (PE). By using the same material for the base 24 and the cushioning members 28 and 30, the porous cushioning members 28 and 30 remains bonded to the non-porous base 24 after the cushioning members 28 and 30 are bathed in a water-based solution to dissolve the fillers and produce pores.

In the exemplary embodiment shown in FIGS. 1-4, the cushioning members 28 and 30 are in essentially the middle of the cosmetic applicator 20, wherein the sides and distal end are defined by the firm base 24. However, it other embodiments, the cushioning members 28 and 30 may extend onto the distal tip and/or the sides of the cosmetic applicator 20 depending on the intended application of the cosmetic applicator 20. In yet other embodiments, the base 24 may be entirely covered by the cushioning members 28 and 30, optionally with the base 24 protruding through a portion of the cushioning members 28 and 30. In that regard, any suitable configuration of a base with a securely attached cushioning member(s) may be used. The cosmetic applicator 20 can be used to apply cosmetic formulation with the cushioning sensorial effect of the cushioning members 28 and/or 30 while simultaneously allowing for precise application with the base 24. In a non-limiting example, the cushioning members 28 and/or 30 may be used to apply lip gloss or a similar cosmetic formulation to the main areas of the upper and lower lips with a cushioning sensorial effect. Moreover, with the cushioning members 28 and 30 defining reservoirs to hold a desired amount of the cosmetic formulation, the cosmetic formulation may be applied until a desired thickness or blended look is achieved. The (optionally flocked plastic) perimeter wall 56 of the base 24 may be used to precisely apply a layer of the cosmetic formulation around the edges of the lips. The precisely applied layer of cosmetic formulation may also be thinner since the solid plastic base 54 does not retain formulation. Moreover, with the robust connection between the base 24 and the cushioning members 28/30, the cosmetic applicator 20 withstands repeated use.

Figure 5:
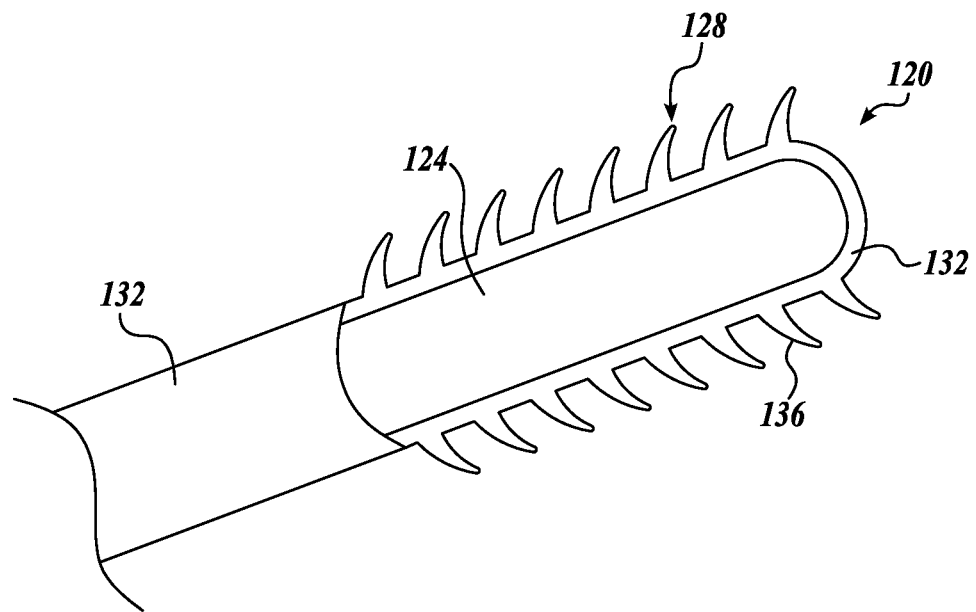
FIG. 5 is an isometric view of a cosmetic applicator formed in accordance with an alternative exemplary embodiment of the present disclosure.
Figure 6:
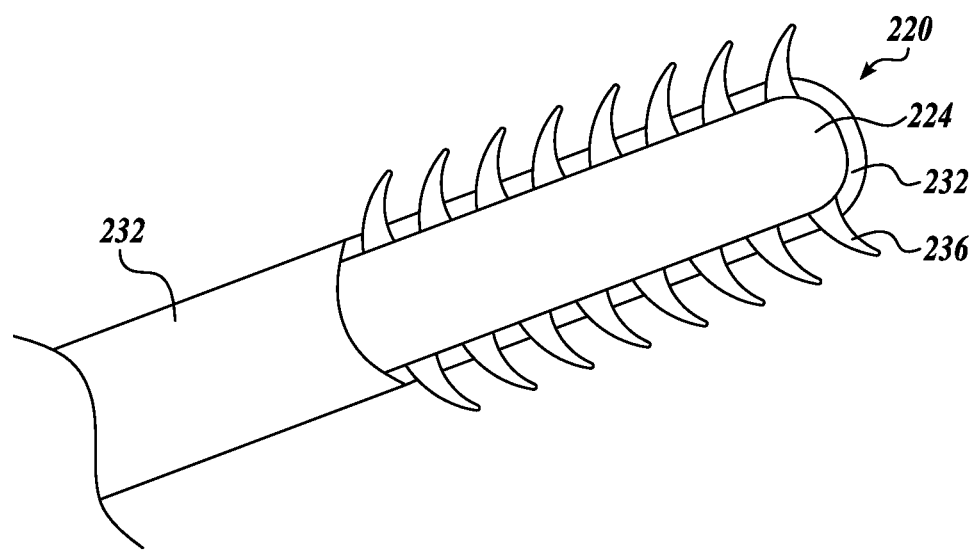
FIG. 6 is an isometric view of a cosmetic applicator formed in accordance with an alternative exemplary embodiment of the present disclosure.

FIGS. 5 and 6 depict first and second alternative embodiments of cosmetic applicators 120 and 220 having similar features to the cosmetic applicator 20 described above. Referring specifically to FIG. 5, the cosmetic applicator 120 includes a firm base 124 that is substantially cylindrically shaped and extends from a distal tip of a stem 132. A cushioning bristle member 128 is attached to and surrounds the base 124. The cushioning bristle member 128 includes a base portion 132 that is attached to and cover the base 124, and a plurality of bristles 136 extending radially outwardly from the base portion 132.

The firm base 124 provides structure, stability, and precision to the applicator 120, while the attached cushioning bristle member 128 provides the beneficial cushioning and reservoir effects. In that regard, the base 124 may be made from similar materials to the base 24 described above, and the cushioning bristle member 128 may be made from similar materials to the base cushioning members 28 and 30 described above. Moreover, the base 124 and the cushioning bristle member 128 are bonded together during the manufacturing process to define a secure attachment therebetween, through bi-injection molding or overmolding, as described above, or in another similar manner.

The cosmetic applicator 120 is configured for use as mascara applicator having a firm base 124 and foam bristles 136. The firm base 124 allows the mascara formulation to be applied in a precise and controlled manner but with a soft feel on the lashes from the foam bristles 136. Moreover, the cushioning bristle member 128 acts as a reservoir, holding a dosed amount of mascara formulation for applying volume to the lashes through repeated application. As noted above, users typically apply several layers of mascara formulation to increase the thickness and/or length of the lashes. The cushioning bristle member 128 can hold a sufficient amount of mascara formulation for repeated, layered use of the cosmetic applicator 120 to build lash thickness and/or length. Moreover, the foam bristles 136 help grip onto and separate the lashes during application.

Although the cosmetic applicator 120 is shown and described as a mascara applicator, the cosmetic applicator 120 may instead be configured for any other suitable use. Accordingly, the descriptions and illustrations provided herein should not be seen as limiting the scope of the claimed subject matter.

Referring to FIG. 6, the cosmetic applicator 220 is similarly configured as a mascara applicator, similar to the cosmetic applicator 120 shown in FIG. 5. In that regard, the cosmetic applicator 220 includes a firm base 224 that is substantially cylindrically shaped and extends from a distal tip of a stem 232. However, in contrast to the cosmetic applicator 120 shown in FIG. 5, a plurality of firm bristles 236 extend radially outwardly from the base 224 and penetrate through a cushioning member 228 attached to and surrounding the base 224.

The firm base 224 and bristles 236 provide structure, stability, and precision to the applicator 220, while the attached cushioning member 228 provides the beneficial reservoir effects. In that regard, the base 224 may be made from similar materials to the base 24 described above, and the cushioning member 228 may be made from similar materials to the base cushioning members 28 and 30 described above. Moreover, the base 224 and the cushioning member 228 are bonded together during the manufacturing process to define a secure attachment therebetween, through bi-injection molding or overmolding, as described above, or in another similar manner.

The cosmetic applicator 220 is configured for use as mascara applicator having a firm base 224 and bristles 236. The firm base 224 and bristles 236 allows the mascara formulation to be applied in a precise and controlled manner. Moreover, the cushioning member 128 acts as a reservoir, holding a dosed amount of mascara formulation for applying volume to the lashes through repeated application.

In other embodiments, a combination of foam and firm bristles may be used with a firm or partially firm base (possibly having foam reservoirs near the base of the bristles). The inventor has found that combined foam and plastic bristles may further improve volume and separation of the lashes.

The detailed description set forth above in connection with the appended drawings is intended as a description of exemplary embodiments of the disclosed subject matter and is not intended to represent the only embodiments. The exemplary embodiments described in this disclosure are provided merely as examples or illustrations of a cosmetic applicator and should not be construed as preferred or advantageous over other embodiments. The illustrative examples provided herein are not intended to be exhaustive or to limit the disclosure to the precise forms disclosed. Similarly, any features and/or process steps described herein may be interchangeable with other features and/or process steps, or combinations of features and/or process steps, in order to achieve the same or substantially similar result.

In the foregoing description, numerous specific details are set forth in order to provide a thorough understanding of the exemplary embodiment of the present disclosure. It will be apparent to one skilled in the art, however, that many embodiments of the present disclosure may be practiced without some or all of the specific details. In some instances, well-known features, subassemblies, and/or process steps have not been described in detail in order not to unnecessarily obscure various aspects of the present disclosure. Further, it will be appreciated that embodiments of the present disclosure may employ any combination of features described herein. For instance, any feature or configuration described above with respect to one wiping assembly may be adapted for use with any other wiping assembly.

Although certain descriptive terms are used to illustrate or describe certain aspects or benefits of the present invention, they should not be seen as limiting. For instance, the present disclosure also includes references to directions, such as "distal," "proximal," "upward," "downward," "top," "bottom," "first," "second," etc. These references and other similar references in the present disclosure are only to assist in helping describe and understand the exemplary embodiments and are not intended to limit the claimed subject matter to these directions. The term "cosmetic formulation" or "cosmetic" should be interpreted broadly to include any cosmetic formulation, beauty product, lotion, lacquer, etc., generally applied to a person's skin, eyes, nails, or other body part. Moreover, it should be appreciated that the cosmetic applicators may also be adapted for other non-cosmetic uses, such as applying medicine, paint, etc., to a desired body part or surface.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. The terms "substantially," "about," "approximately," etc., mean plus or minus 5% of the stated value.

While illustrative embodiments have been illustrated and described, it will be appreciated that various changes can be made therein without departing from the spirit and scope of the invention.

The embodiments of the invention in which an exclusive property or privilege is claimed are defined as follows:

1. A cosmetic applicator, comprising:
   a flattened non-porous base including a first side opposite and separated from a second side with at least one opening through the non-porous base, wherein the opening traverses between the first and second sides across a thickness of the non-porous base, wherein the first side is recessed and the second side is recessed; and
   a porous foam cushioning member is attached on the first and the second sides within the recesses, and the porous foam cushioning member extends from the first side to the second side through the at least one opening in the non-porous base, wherein the non-porous base has a base perimeter wall that extends around recessed areas of the first side and the second side, and the base perimeter wall is a flocked plastic, wherein the base perimeter wall extends around the flattened non-porous base and the base perimeter wall extends outward from the first and second sides of the non-porous base, and the porous foam cushioning member extends outward beyond the base perimeter wall from the first and second sides.

2. The cosmetic applicator of claim 1, wherein the non-porous base and the porous foam cushioning member are made from the same material.

3. The cosmetic applicator of claim 1, wherein the non-porous base and the porous foam cushioning member are made from a material chosen from the group consisting of polyethylene, polypropylene, propylene, styrene-ethylene polymer, butylene-styrene polymer, thermo polymer, and any combination thereof.

4. The cosmetic applicator of claim 1, wherein the porous foam cushioning member covers only a portion of the non-porous base such that the non-porous base is exposed for use during application of a cosmetic formulation.

5. The cosmetic applicator of claim 1, wherein the non-porous base protrudes through a portion of the porous foam cushioning member.

6. The cosmetic applicator of claim 5, wherein the portion of the non-porous base protruding through the porous foam cushioning member is a plurality of bristles.

7. The cosmetic applicator of claim 1, wherein the porous foam cushioning member covers a majority of the non-porous base.

8. The cosmetic applicator of claim 1, wherein at least a portion of the first side or the second side is a flocked plastic.

9. The cosmetic applicator of claim 1, wherein the porous foam cushioning member is sized to define a reservoir for retaining a predetermined amount of cosmetic formulation.

10. The cosmetic applicator of claim 1, wherein the at least one recess is sized to define a reservoir for retaining a predetermined amount of cosmetic formulation.

11. The cosmetic applicator of claim 1, wherein the porous foam cushioning member is molded into the first recess and the second recess.

* * * * *